United States Patent
Stephenson (10) Patent No.: US 8,892,907 B2
(45) Date of Patent: *Nov. 18, 2014

(54) STORAGE AND RECOVERY OF CRYPTOGRAPHIC KEY IDENTIFIERS

(71) Applicant: NetApp, Inc., Sunnyvale, CA (US)

(72) Inventor: David Stephenson, San Mateo, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/142,112

(22) Filed: Dec. 27, 2013

(65) Prior Publication Data

US 2014/0143555 A1    May 22, 2014

Related U.S. Application Data

(63) Continuation of application No. 12/109,693, filed on Apr. 25, 2008, now Pat. No. 8,621,241.

(51) Int. Cl.
*G06F 12/14* (2006.01)
*H04L 29/06* (2006.01)

(52) U.S. Cl.
CPC ............ *G06F 12/1408* (2013.01); *G06F 12/14* (2013.01); *H04L 29/06* (2013.01)
USPC ........... 713/193; 713/191; 713/155; 711/103; 711/162

(58) Field of Classification Search
CPC ................................. G06F 12/14; H04L 29/06
USPC .................... 713/193, 191, 155; 711/103, 162
See application file for complete search history.

(56) References Cited

U.S. PATENT DOCUMENTS

| | | | |
|---|---|---|---|
| 6,721,862 B2 | 4/2004 | Grant et al. |
| 7,814,316 B1 | 10/2010 | Hughes et al. |
| 2004/0015724 A1 | 1/2004 | Pham et al. |
| 2006/0143476 A1 | 6/2006 | McGovern |
| 2007/0118685 A1 | 5/2007 | Estakhri |
| 2008/0098236 A1 | 4/2008 | Pandey et al. |
| 2008/0219449 A1 | 9/2008 | Ball et al. |

OTHER PUBLICATIONS

Office Action mailed May 22, 2013, for related U.S. Appl. No. 12/109,693, filed Apr. 25, 2013, 22 pages.
Office Action mailed Nov. 7, 2012, for related U.S. Appl. No. 12/109,693, filed Apr. 25, 2013, 22 pages.
Office Action mailed Jun. 28, 2012, for related U.S. Appl. No. 12/109,693, filed Apr. 25, 2013, 21 pages.
Office Action mailed Nov. 30, 2011, for related U.S. Appl. No. 12/109,693, filed Apr. 25, 2013, 19 pages.
Office Action mailed Apr. 28, 2011, for related U.S. Appl. No. 12/109,693, filed Apr. 25, 2013, 17 pages.

*Primary Examiner* — Jeffrey Pwu
*Assistant Examiner* — Samuel Ambaye
(74) *Attorney, Agent, or Firm* — Mahamedi Paradice LLP (57) ABSTRACT

Example embodiments provide various techniques for storing and recovering a cryptographic key identifier that may be used to recover encrypted data. The cryptographic key identifier may be stored with the encrypted data itself. In an example, the cryptographic key identifier may be stored in particular blocks on a logical disk that are specifically designated to store the cryptographic key identifier. To store the cryptographic key identifiers in the designated blocks, the data within the blocks is compressed to fit the cryptographic key identifiers within the blocks. This cryptographic key identifier can be recovered at a later time by locating the designated blocks and retrieving the cryptographic key identifier from the blocks.

20 Claims, 10 Drawing Sheets

STORAGE AND RECOVERY OF CRYPTOGRAPHIC KEY IDENTIFIERS

RELATED APPLICATIONS

This application is a Continuation of U.S. patent application Ser. No. 12/109,693, entitled "STORAGE AND RECOVERY OF CRYPTOGRAPHIC KEY IDENTIFIERS", filed Apr. 25, 2008; the aforementioned priority application being hereby incorporated by reference in its entirety for all purposes.

FIELD

The present disclosure relates generally to storage systems. In an example embodiment, the disclosure relates to the storage and recovery of cryptographic key identifiers.

BACKGROUND

Without protection, data stored on storage devices (e.g., hard disks, tapes, non-volatile memories, and other storage devices) is basically accessible to anyone with access to the storage devices. In particular, data accessible by way of a computer network, such as network storage, is especially vulnerable to unauthorized access, modification or deletion.

To protect the stored data, the stored data may be encrypted. In general, encryption transforms the stored data using an algorithm to make the stored data unreadable to anyone except those possessing information that may be used to decrypt the data. Such information is typically stored separately from the storage devices and can be lost, for example, from data corruption or when the storage device is redeployed to a different storage system. Without such information, the stored data on a storage device cannot be recovered.

SUMMARY

Example embodiments provide various techniques for storing and recovering information that may be used to recover encrypted data. The information used to recover encrypted data is a cryptographic key identifier. Generally, the cryptographic key identifier is a value that refers to or identifies a cryptographic key used to encrypt the stored data. A cryptographic key is a code, number or value that, when taken together with an encryption algorithm, defines a unique transformation used to encrypt or decrypt data. As a security feature, cryptographic keys may be stored together in a secure storage area. This secure storage area may be secured such that the cryptographic keys are not openly accessible unless with a cryptographic key identifier. To retrieve a cryptographic key from the secure storage area, the cryptographic key identifier may be provided and the cryptographic key associated with the cryptographic key identifier may then be retrieved from the secure storage area.

The cryptographic key identifier may be stored with the encrypted data itself such that if the cryptographic key used to encrypt the stored data is lost, the "backup" cryptographic key identifier associated with the cryptographic key can be recovered by locating particular portions of the data and retrieving the cryptographic key identifier from the data itself. As a result, the possibility of losing the cryptographic key identifiers used to recover the cryptographic keys is mitigated because the cryptographic key identifiers are stored with the data itself. It should be appreciated that the cryptographic key is not stored with the data itself because storing the cryptographic key with the data exposes the cryptographic key, which may be directly used to decrypt the encrypted data and thereby circumvent the encryption used to secure the data.

In an example, the cryptographic key identifier may be stored in particular blocks on a logical disk that are specifically designated to store the cryptographic key identifier. In general, a logical disk provides an area of usable storage capacity on one or more physical storage devices. In an example, these particular blocks may be designated to store cryptographic key identifiers because the blocks are assigned to store file system information. However, it should be appreciated that any two or more suitable blocks on a logical disk may be designated to store redundant copies of the cryptographic key identifiers.

To store the cryptographic key identifiers in the designated blocks, the data within the blocks is compressed to fit the cryptographic key identifiers within the blocks. For example, if a block is filled with data, then the block does not have space to fit additional data, such as a cryptographic key identifier. As a result, the data within the block may be compressed to reduce the size of the data. With the size of the data within a block reduced, the cryptographic key identifier may then be stored within the block along with the compressed data.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to one skilled in the art that embodiments of the inventive subject matter may be practiced without these specific details. In general, well-known instruction instances, protocols, structures and techniques have not been shown in detail.

In general, cryptography is the coding and decoding of data in order to keep these data secure. Cryptographic techniques may be used to secure data stored on a storage device. For example, the data stored on the storage device may be encrypted using an algorithm to make the data unreadable. A cryptographic key may be used to decrypt the data stored on the storage device to make the data readable. The cryptographic key may be identified or located with a cryptographic key identifier, which is a value that refers to or identifies the cryptographic key. As will be explained in more detail below, the cryptographic key identifier is stored with the data in the storage device. In the event that the cryptographic key is lost, for example, from data corruption, the cryptographic key identifier may be retrieved from the storage device and used to locate the cryptographic key.

Figure 1A:
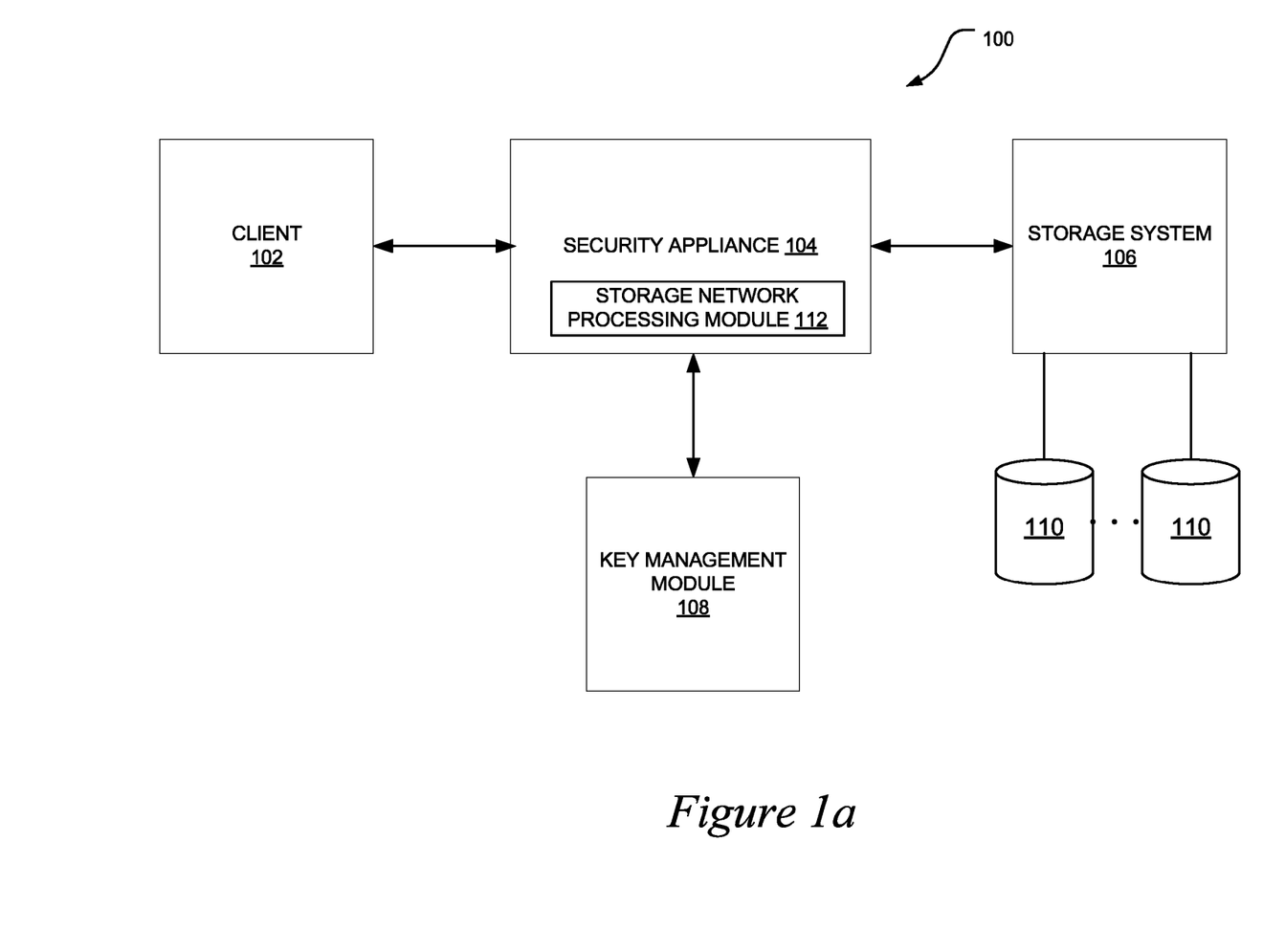
FIGS. 1a and 1b depict simplified block diagrams of systems, in accordance with example embodiments, for storing and retrieving cryptographic key identifiers from storage devices.
Figure 1B:
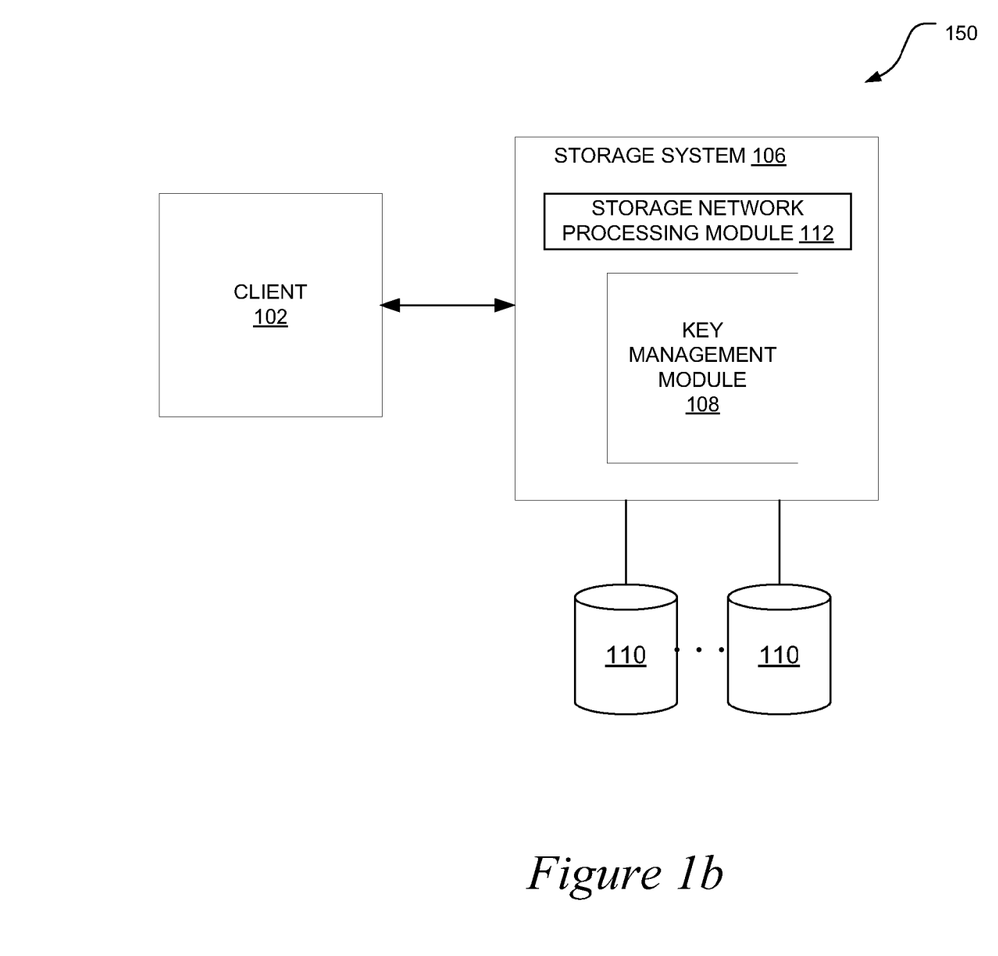

FIGS. 1a and 1b depict simplified block diagrams of systems 100 and 150, in accordance with example embodiments, for storing and retrieving cryptographic key identifiers from storage devices 110. FIG. 1a depicts an example embodiment of system 100 that includes client 102, security appliance 104, storage system 106, storage devices 110, and key management module 108. In general, storage system 106 is a computing device that provides a storage service related to the organization of information on writable, persistent storage devices 110, such as non-volatile memories, tapes, hard drives, optical media or other storage devices. The storage system 106 can be deployed within a Storage Area Network (SAN) or a Network Attached Storage (NAS) environment.

When used within a NAS environment, for example, storage system 106 may be embodied as a file server that is configured to operate according to a client/server model of information delivery to thereby allow multiple client computing devices (clients) 102 to access shared resources, such as files, stored on the file server. The storage of information on a NAS environment can be deployed over a computer network that includes a geographically distributed collection on interconnected communication links, such as Ethernet, that allows clients 102 to remotely access the information (e.g., files) on the file server. The clients 102 can communicate with the file server by exchanging discrete frames or packets of data according to predefined protocols, such as Transmission Control/Internet Protocol (TCP/IP).

A SAN is a high-speed network that enables establishment of direct connections between storage system 106 and its storage devices 110. The SAN may thus be viewed as an extension to a storage bus and, as such, an operating system of storage system 106 enables access to stored data using block-based access protocols over an extended bus. In this context, the extended bus can be embodied as Fibre Channel, Computer System Interface (SCSI), Internet SCSI (iSCSI) or other network technologies.

As shown in FIG. 1, security appliance 104 is coupled between client 102 and storage system 106. The security appliance 104 intercepts a data access request issued by client 102 that is destined for storage system 106. The data access request may be a read request to retrieve certain data stored on storage devices 110 coupled to storage system 106 or a write request to store data on the storage devices. In an example write request, security appliance 104 intercepts the write request, encrypts the data associated with the write request, and forwards the encrypted data to storage system 106 for storage at a specified location (address) on one or more storage devices 110. In an example read request, security appliance 104 intercepts the read request and forwards the read request onto storage system 106, which returns the requested data to the security appliance in encrypted form. The security appliance 104 then decrypts the encrypted data and returns the decrypted data to client 102.

The key management module 108 is configured to store and manage the cryptographic keys used by security appliance 104. In general, a cryptographic key (or encryption keys) is information or a parameter that controls the operation of a cryptographic algorithm. For example, a cryptographic key is a code, number or value that, when taken together with an encryption algorithm, defines a unique transformation used to encrypt or decrypt data. Examples of cryptographic keys include hexadecimal 128-bit numbers, 192-bit numbers, and 256-bit numbers. The security appliance 104 uses one or more cryptographic keys to encrypt and decrypt data securely stored on storage system 106. The security appliance 104 may send requests for cryptographic keys to key management module 108 and, in response, the key management module sends the requested cryptographic keys on demand to the security appliance. The key management module 108 may further be configured to support multiple security appliances such that, when a particular security appliance 104 encounters a data access request for which the security appliance does not have the appropriate cryptographic key, that security appliance accesses the key management module to retrieve the appropriate cryptographic key.

Accordingly, data stored on storage devices 110 is encrypted with one or more cryptographic keys. Without the cryptographic keys, the stored data cannot be read. Cryptographic keys can be lost, for example, from data corruption. Additionally, when storage devices 110 are redeployed to a different storage system, the retrieval of cryptographic keys used to decrypt the data can be difficult and complicated. In the illustrative example embodiments, security appliance 104 employs storage network processing module 112 to guard against the risk of losing the cryptographic keys. As explained in more detail below, storage network processing module 112 stores information with the data (and also within storage devices 110) that may be used to recover the cryptographic keys.

FIG. 1b depicts another example embodiment of system 150 that includes client 102, storage system 106, and storage devices 110. Client 102 is in communication with storage system 106 and may access information stored on storage devices 110. As discussed above, storage system 106 is a computing device that provides a storage service related to the organization of information on writable, persistent storage devices 110. Here, storage system 106 includes storage network processing module 112 and key management module 108. As a result, storage system 106 may itself store and manage cryptography keys, receive data access requests issued by client 102, and encrypt or decrypt data stored on or retrieved from storage devices 110, depending on the type of request.

Figure 2:
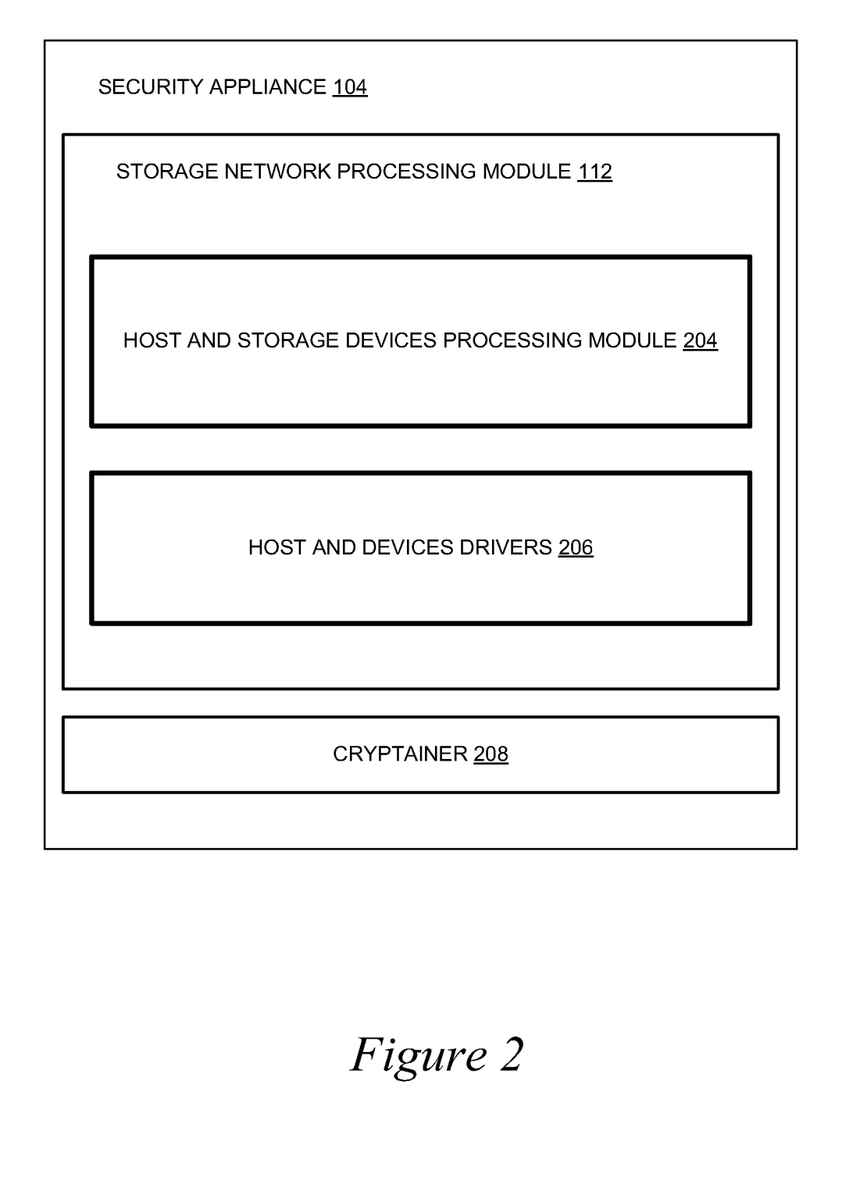
FIG. 2 depicts a simplified block diagram of modules, in accordance with an example embodiment, included in security appliance.

FIG. 2 depicts a simplified block diagram of modules, in accordance with an example embodiment, included in security appliance 104. It should be appreciated that security appliance 104 may include a variety of computing devices, such as a server, a network switch, a gateway or other computing devices. A network switch enables connectivity between devices, such as between a computing device and a storage device. An example of a network switch is a Fibre Channel switch used in SANs. In general, a Fibre Channel switch is a network switch that is compatible with the Fibre Channel protocol and enables connectivity between, for example, a computing device and a Fibre Channel storage device. Nodes within a SAN may interconnect with each other through connection with one or more Fibre Channel switches. The Fibre Channel switch provides routing and aliasing, name server, and zoning functions. An example of a gateway is an Internet Computer System Interface (iSCSI) gateway. In general, an iSCSI gateway serves as an entrance to another network, such as Fibre Channel, and vice versa. As such, the iSCSI gateway enables connectivity to iSCSI devices. For example, the iSCSI gateway may create a connection between Fibre Channel and iSCSI such that iSCSI clients can connect to Fibre Channel storage.

As depicted in FIG. 2, security appliance 104 may include storage network processing module 112 and cryptainer 208. As used herein, cryptainer 208 is a piece of storage, such as a logical disk, on one or more storage devices, in which the encrypted data is stored. In general, security appliance 104 is configured to transform unencrypted data (clear text) into encrypted data (cipher text) destined for secure storage or cryptainers 208 on the storage system. A logical disk provides an area of usable storage capacity on one or more physical storage devices. Examples of logical disks include a partition, a logical volume, a virtual disk, a storage device, a region on the storage device, several regions on the storage device, a collection of files, a collection of directories, a collection of blocks, and other logical disks.

In a SAN environment, cryptainer 208 is accessible as a block identifier (e.g., a Logical Unit Number (LUN)). It should be noted that Small Computer System Interface (SCSI) protocol, Fibre Channel Protocol, and Internet SCSI (iSCSI) address subcomponents of a device by the block identifier. Alternatively, these subcomponents may also be called LUNs. Here, for example, a storage device can be associated with a unique LUN. In addition, for example, a LUN may also be assigned to a logical disk. Other examples of LUNs include physical or virtual hard disks exported from a disk subsystem and the tape drives and the media changer of a tape library. In the context of a NAS environment, cryptainer 208 may be a collection of files on one or more storage devices. Specifically, in Common Internet File System (CIFS) protocol, cryptainer 208 may be a share, while in the context of a Network File System (NFS) protocol, the cryptainer may be a mount point. In a tape environment, cryptainer 208 may be a tape containing multiple tape blocks.

Each cryptainer, such as cryptainer 208, is associated with its own cryptographic key, which is used by security appliance 104 to encrypt and decrypt the data stored on the cryptainer. Data remains encrypted while stored in cryptainer 208 until requested by an authorized client. At that time, security appliance 104 retrieves the encrypted data from cryptainer 208, decrypts the encrypted data, and forwards the unencrypted data to the client.

The security appliance 104 also includes storage network processing module 112. The storage network processing module 112 may further include host and storage devices processing module 204 and host and devices drivers 206. The host and devices drivers 206 provide storage network processing module 112 with capability to control and communicate with a variety of peripheral devices. In the illustrative example embodiments, storage network processing module 112 is configured to store information within the logical disks that may be used to retrieve the cryptographic keys in situations where the cryptographic keys used to encrypt the data are lost. As explained in more detail below, storage network processing module 112 fits such information within the logical disks by compressing blocks of data.

It should be appreciated that storage network processing module 112 may be in the form of software that is processed by a processor. In another example, storage network processing module 112 may be in the form of firmware that is processed by Application Specific Integrated Circuits (ASICs), which may be integrated into a circuit board. Alternatively, storage network processing module 112 may be in the form of one or more logic blocks included in a programmable logic device (e.g., a field-programmable gate array). The described modules may be adapted, and/or additional structures may be provided, to provide alternative or additional functionalities beyond those specifically discussed in reference to FIG. 2. Examples of such alternative or additional functionalities will be discussed in reference to the flow diagrams discussed below. The modifications or additions to the structures described in relation to FIG. 2 to implement these alternative or additional functionalities will be implementable by those skilled in the art, having the benefit of the present specification and teachings.

Figure 3:
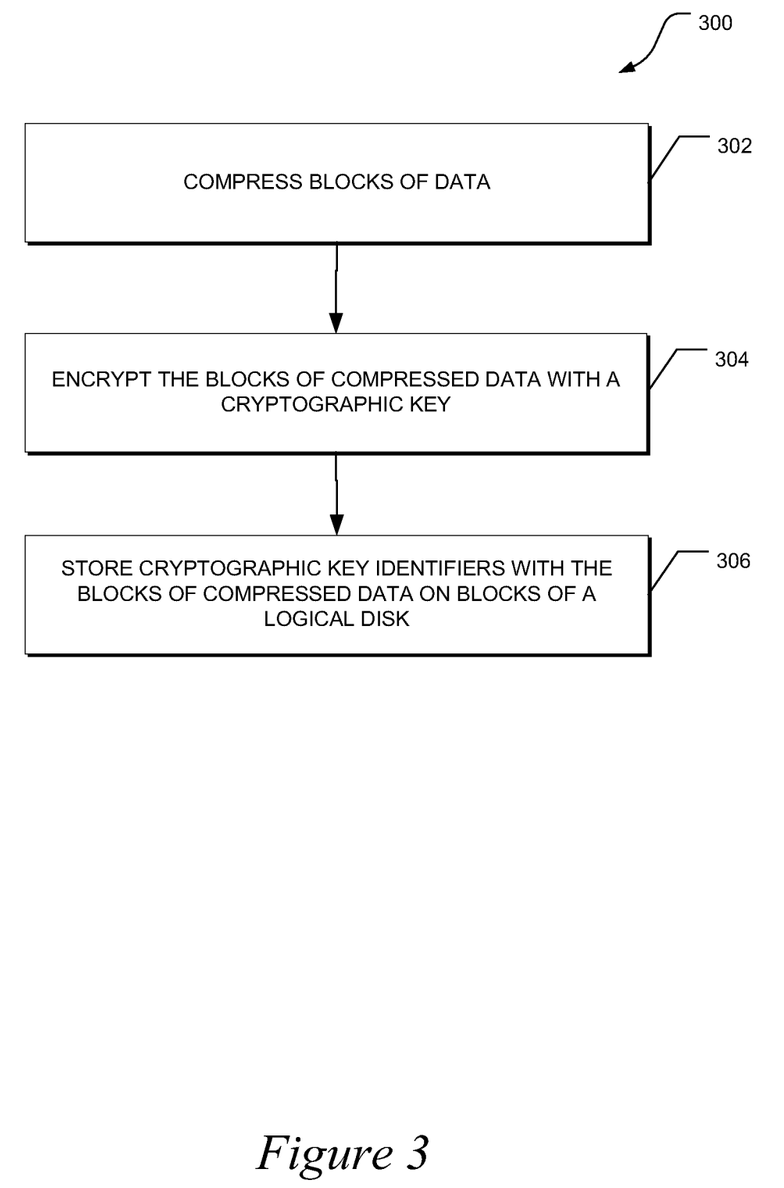
FIG. 3 depicts a flow diagram of a general overview of a method, in accordance with an example embodiment, for storing a cryptographic key identifier on a logical disk.

FIG. 3 depicts a flow diagram of a general overview of a method, in accordance with an example embodiment, for storing a cryptographic key identifier on a logical disk. In an example embodiment, method 300 may be implemented by storage network processing module 112 of FIG. 2 and employed in security appliance 104. As depicted in FIG. 3, two or more blocks of data are compressed at 302 to fit cryptographic key identifiers within the blocks. The blocks of data are to be stored on blocks within a logical disk. A block is a sequence of bytes or bits having a nominal length (or a block size). Examples of block sizes include 8 kilobytes, 64 kilobytes, 512 kilobytes, and other block sizes. Many file systems store and structure data on logical disks in blocks. A block may therefore be the smallest size that is written to or read from a logical disk. A single block may include all or a portion of one or more files.

Here, two or more blocks are selected to store a cryptographic key identifier, which is explained in more detail below. In a logical disk, at least two or more blocks are configured to store the cryptographic key identifier. In an example embodiment, such blocks may be the least accessed blocks. Blocks that are not accessed frequently may include blocks that are assigned to store file system information. File system information may include, for example, an allocation table. An allocation table is a table used to locate files on a logical disk. Examples of allocation tables include File Allocation Table (FAT) 16, FAT32, and other allocation tables. Alternatively, as will be explained in more detail below, every block to the power of two may be configured to store the cryptographic key identifier.

The blocks of data are compressed to generate blocks of compressed data. It should be appreciated that a variety of data compression algorithms may be used to compress the blocks of data. The blocks of data are compressed such as to make space on the logical disk for a cryptographic key identifier, which identifies the cryptographic key used to encrypt the data stored on the logical disk and is explained in more detail below. For example, if a block is filled with data, then the block does not have space to fit additional data, such as a cryptographic key identifier. As a result, the data within the block may be compressed to reduce the size of the data. With the size of the data within a block reduced, the cryptographic key identifier may then be stored within the block along with the compressed data. As such, the size of a block of compressed data and the size of a cryptographic key identifier cannot exceed the size of a block.

As depicted in FIG. 3, two or more blocks of compressed data are encrypted with a cryptographic key at 304. To encrypt blocks of data, a variety of encryption algorithms, such as Advanced Encryption Standard (AES), can be employed to transform unencrypted data into encrypted data intended for secure storage on the storage system. To that end, software or hardware-based pseudo random number generation techniques may be used to generate cryptographic keys used to encrypt blocks of data on a logical disk. In an example, a single cryptographic key is used to encrypt all the data on a logical disk. In another example, if the logical disk comprises a single storage device, then the single cryptographic key is associated with the storage device and may be used to encrypt all the data on the storage device.

A cryptographic key can be associated with a cryptographic key identifier. A cryptographic key identifier is a unique value that is assigned to a cryptographic key. The cryptographic key identifier therefore is configured to identify or reference a particular cryptographic key. An example of a cryptographic key identifier is a random number assigned to a particular cryptographic key. For example, a cryptographic key identifier may be a random 0x64-bit hexadecimal number (e.g., 0x0000000000011bcf). As a security feature, instead of referencing the cryptographic key directly, a cryptographic key identifier may be instead used. The cryptographic keys may be stored together in a secure storage area, such as the key management module described in FIGS. 1a and 1b, such that the cryptographic keys are not openly accessible unless with a cryptographic key identifier. As a result of referencing the cryptographic keys with cryptographic identifiers, the exposure of cryptographic keys is minimized in cryptographic operations. For example, as explained in more detail below, the cryptographic key identifiers and not the cryptographic key itself are stored with the data.

Still referring to FIG. 3, when a security appliance needs a particular cryptographic key from the key management module, the security appliance sends a cryptographic key request that references a cryptographic key identifier to the key management module. The associations or correlations of the cryptographic key identifiers with the cryptographic keys can be stored in the key management module. The key management module locates the cryptographic key with the cryptographic key identifier based on the stored associations, and then transmits the cryptographic key to the security appliance. It should be additionally noted that, as discussed above, a cryptographic key may be assigned to a logical disk. In some examples, a logical disk may be referenced by a LUN and therefore, a cryptographic key identifier can be assigned to or associated with a logical disk.

If the blocks of data can be compressed to a size such that the cryptographic key identifiers fit within the blocks, then the cryptographic key identifiers and the blocks of compressed data are stored in the blocks at 306. In effect, the cryptographic key identifier may be stored with the compressed data itself such that if the cryptographic key used to encrypt the stored data is lost, the "backup" cryptographic key identifier associated with the cryptographic key can be recovered by locating particular portions of the data and retrieving the cryptographic key identifier from the data itself. As a result, the possibility of losing the cryptographic key identifiers used to recover the cryptographic keys is mitigated because the cryptographic key identifiers are stored with the data itself.

Figure 4:
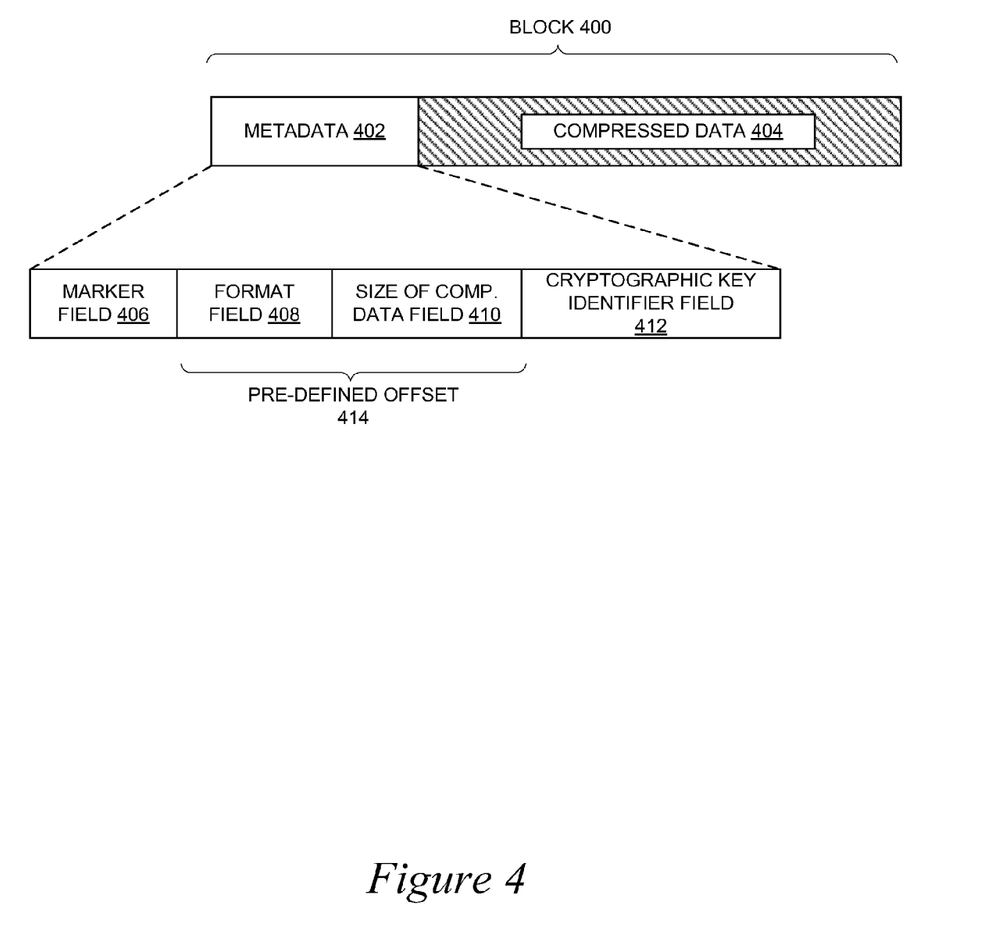
FIG. 4 depicts a block diagram illustrating a metadata portion that includes a cryptographic key identifier, in accordance with an example embodiment.

FIG. 4 depicts a block diagram illustrating a metadata portion 402 that includes a cryptographic key identifier, in accordance with an example embodiment. It should be appreciated that the cryptographic key identifier may be included with metadata 402. Block 400 includes metadata 402 and compressed data 404. The metadata 402 may include a variety of data that may relate to block 400, compressed data 404, and/or other data. In an example, the metadata 402 can be a 32-byte structure that begins with marker field 406. The marker field 406 includes a marker used to identify valid metadata. The marker is a specific value that identifies the presence of metadata 402. For example, metadata 402 can be located by locating the marker. The metadata format version field 408 and size of compressed data field 410 may be located after marker field 406. The cryptographic key identifier field 412 may be located after the size of compressed data field 410 and the cryptographic key identifier field includes the cryptographic key identifier. It should be noted that the cryptographic key identifier (or cryptographic key identifier field 412) may be located within predefined offset 414 from marker field 406. As depicted in FIG. 4, predefined offset 414 may be the size of metadata format version field 408 and size of compressed data field 410. As a result, cryptographic key identifier may be located within block 400 by initially locating marker included in marker field 406.

Figure 5:
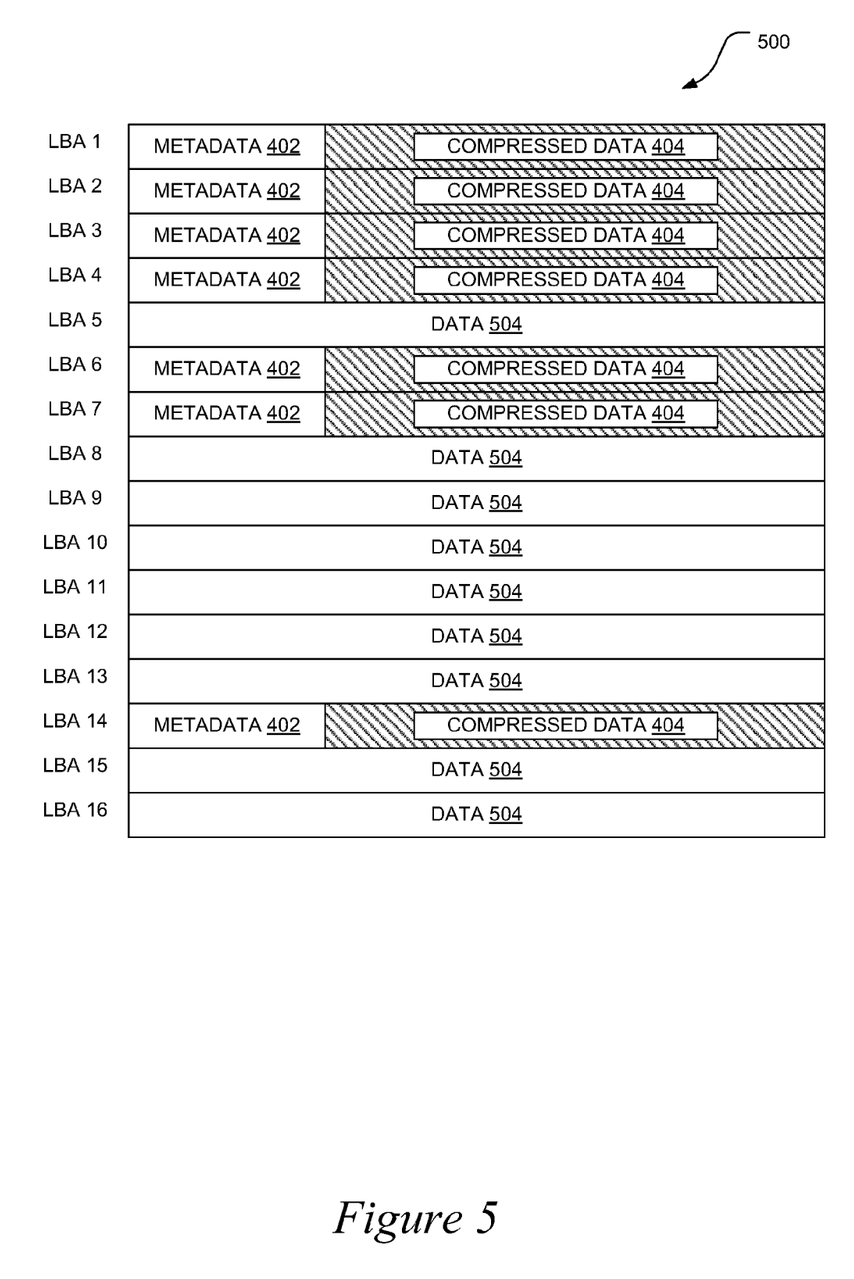
FIG. 5 depicts a diagram illustrating blocks, in accordance with an example embodiment, that that are configured to store cryptographic key identifiers.

FIG. 5 depicts a diagram illustrating blocks 500, in accordance with an example embodiment, that that are configured to store cryptographic key identifiers. Blocks 500 include 16 blocks with logical block addressing (LBA) 1-16. An LBA refers to an address of a block. In LBA, blocks 500 are addressed or located by an index, where the first block being LBA 0, second block being LBA 1, third block being LBA 2, . . . LBA n. Blocks 500 of LBA 1-16 within a logical disk are assigned to store an allocation table. In effect, blocks 500 between LBA 0 and LBA 17 are assigned to store an allocation table. Each block from blocks 500 therefore stores a portion of the allocation table.

In addition to the allocation table, blocks 500 are also configured to store metadata 402, which include cryptographic key identifiers. However, metadata 402 is stored in a block if the block of data within the block can be compressed to fit the metadata. For example, as illustrated in FIG. 5, blocks of data within blocks of LBA 1-4, 6-7, and 14 can be compressed to generate blocks of compressed data 404. With compressed data 404, space can be made to fit metadata 402 within each block of LBA 1-4, 6-7 or 14. On the other hand, metadata 402 are not included in blocks of LBA 5, 8-13, and 15-16 because data 504 included in the blocks cannot be compressed to a sufficient size such that the metadata can fit within the blocks.

As will be explained in more detail below, the cryptographic key identifier can be retrieved from any block of LBA 1-4, 6-7 or 14. The assignment of two or more blocks, such as blocks 500, to store multiple copies of the same cryptographic key identifier provides redundancy and increases the probability that at least one cryptographic key identifier is stored on a logical disk and therefore, increases the probability that the cryptographic key may be recovered. For example, the probability that at least one block of data from a total of 16 blocks of data stored within blocks 500 can be sufficiently compressed to fit metadata 402 is greater than when compared to having only one block configured to store the metadata (or a cryptographic key identifier).

Figure 6:
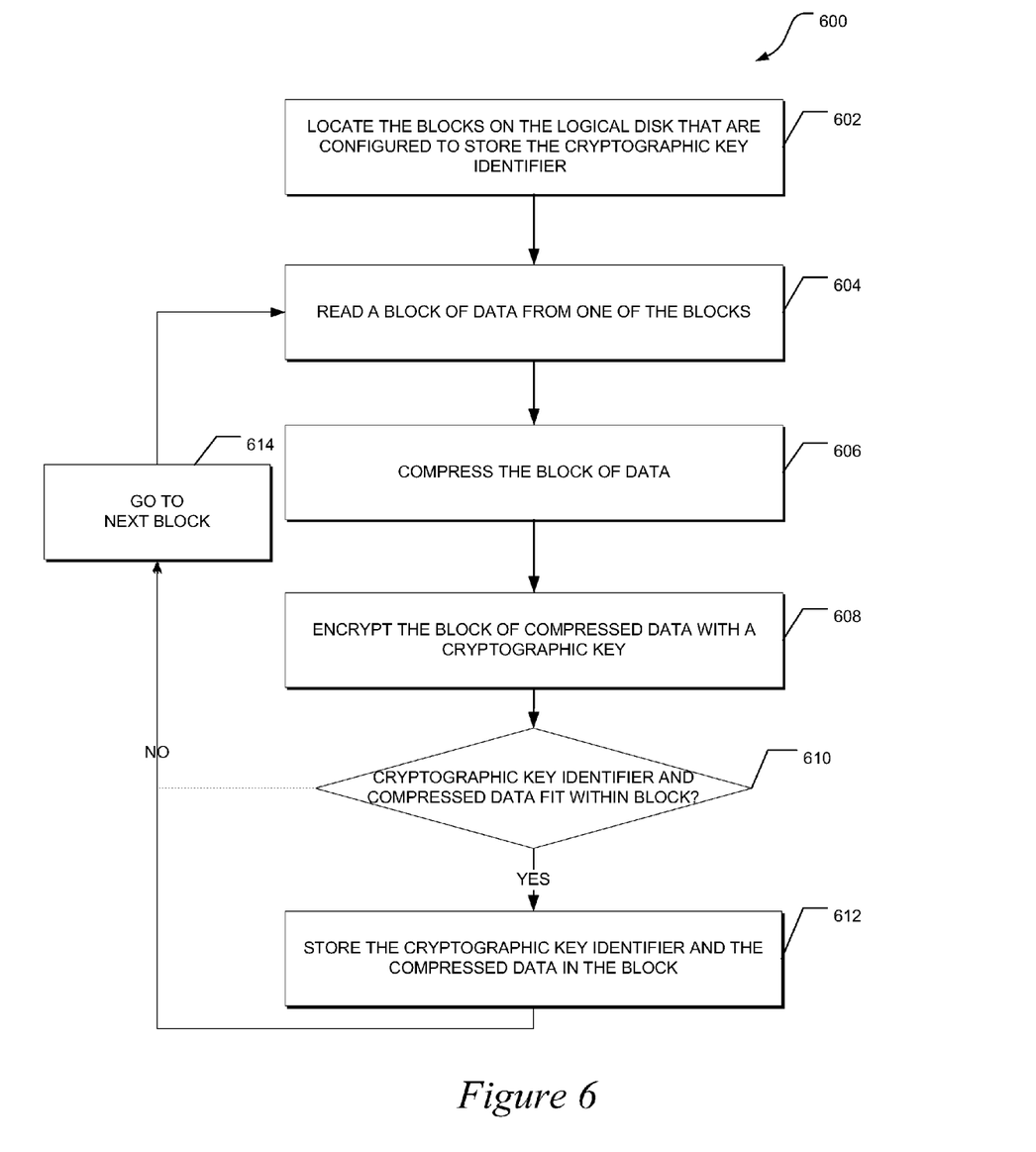
FIG. 6 depicts a flow diagram of detailed methods, in accordance with an example embodiment, for storing a cryptographic key identifier on a logical disk.

FIG. 6 depicts a flow diagram of detailed methods, in accordance with an example embodiment, for storing a cryptographic key identifier on a logical disk. In an example embodiment, method 600 may be implemented by storage network processing module 112 of FIG. 2 and employed in security appliance 104. As depicted in FIG. 6, when a request is received to store a cryptographic key identifier on a logical disk, the blocks of the logical disk that are configured to store the cryptographic key identifier are located at 602. There are at least two or more blocks on the logical disk that are assigned to store the cryptographic key identifier and, in an example embodiment, these blocks may be also assigned to store file system information, such as an allocation table.

A block of data is then read from one of the blocks at 604. The block of data is compressed at 606 and then encrypted at 608 with a cryptographic key. A determination is then be made at 610 whether the cryptographic key identifier (or metadata) and the compressed data can fit within the block. The determination can be expressed as $$\text{Size a block of compressed data} + \text{Size of metadata} \leq \text{Size of block}$$

where the size of a block of compressed data and the size of the metadata cannot exceed the size of a block. For example, if a size of a block is 512 kilobytes and a size of metadata is 64 kilobytes, then the size of a block of data is compressed to be less than or equal to 448 kilobytes (512 kilobytes–64 kilobytes) such that the metadata can fit within the block.

If the cryptographic key identifier and the block of compressed data are identified to fit within the block (or the block of data can be compressed to a sufficient size), then the cryptographic key identifier is attached to the compressed data, and the cryptographic key identifier and the compressed data are stored in the block at 612. The next block configured to store a cryptographic key identifier is accessed at 614 and the methods are repeated until all the blocks configured to store the cryptographic key identifiers are accessed. On the other hand, if the cryptographic key identifier and the block of compressed data are identified not to fit within the block (or the block of data cannot be compressed to a sufficient size), then the next block configured to store the cryptographic key identifier is accessed.

Figure 7:
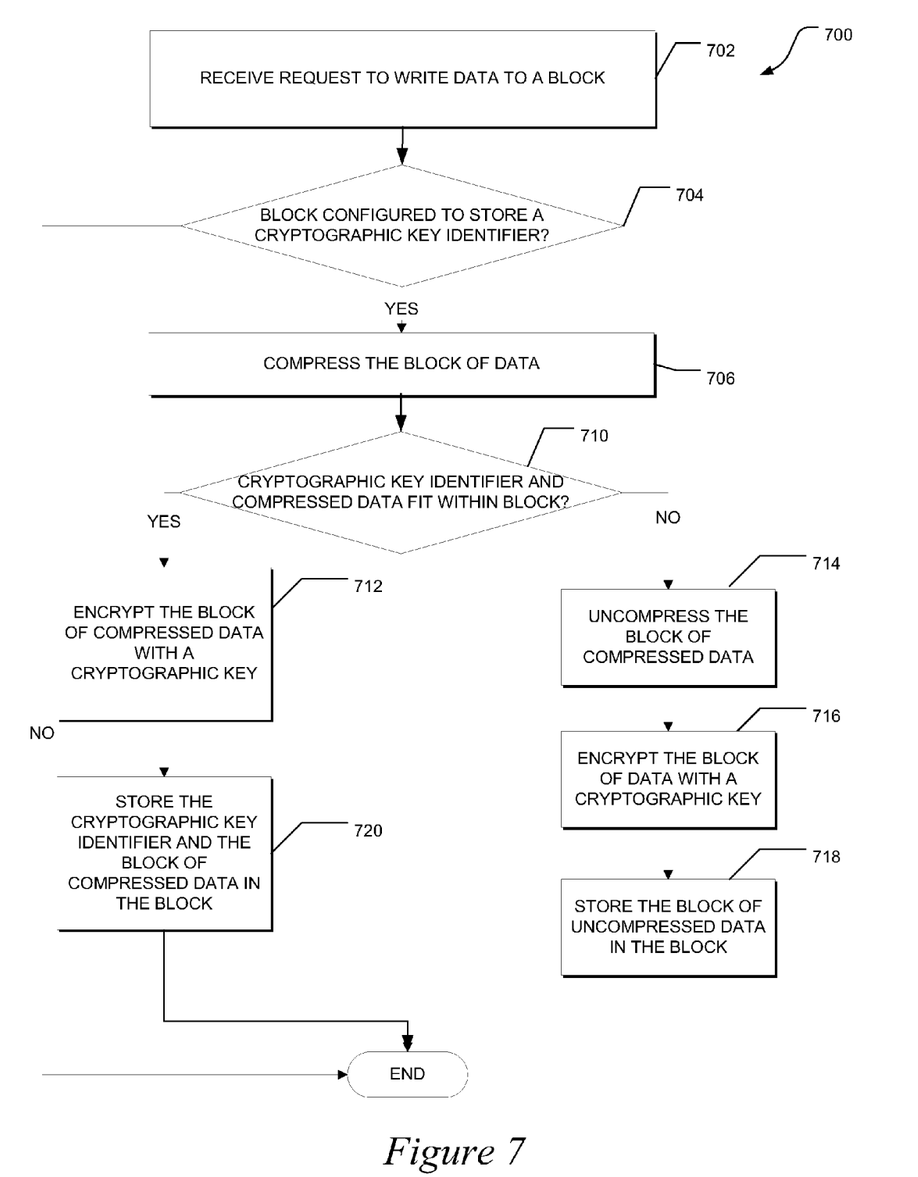
FIG. 7 depicts a flow diagram of detailed methods, in accordance with an example embodiment, for storing a cryptographic key identifier on a logical disk in a write operation.

FIG. 7 depicts a flow diagram of detailed methods, in accordance with an example embodiment, for storing a cryptographic key identifier on a logical disk in a write operation. In an example embodiment, method 700 may be implemented by storage network processing module 112 of FIG. 2 and employed in security appliance 104. As depicted in FIG. 7, a request to write a block of data to a block is received at 702. Thereafter, a determination is made at 704 whether the block being accessed is configured to store a cryptographic key identifier. As discussed above, in an example embodiment, blocks with LBA 1-16 that are assigned to store file system information may also be configured to store cryptographic key identifiers.

If the block is identified not to store the cryptographic key identifier, then the cryptographic key identifier is not stored in that block. On the other hand, if the block is identified to store the cryptographic key identifier, then the block of data is compressed at 706. A determination may then be made at 710 whether the cryptographic key identifier (or metadata) and the compressed data can fit within the block. If the cryptographic key identifier and the compressed data are identified not to fit within the block, then the block of compressed data is uncompressed at 714. The uncompressed data thereafter is encrypted at 716 and stored in the block at 718. However, if the cryptographic key identifier and the compressed data are identified to fit within the block, then the block of compressed data is encrypted with a cryptographic key at 712. The cryptographic key identifier thereafter is attached to the compressed data, and the cryptographic key identifier and the compressed data are stored in the block at 720.

Figure 8:
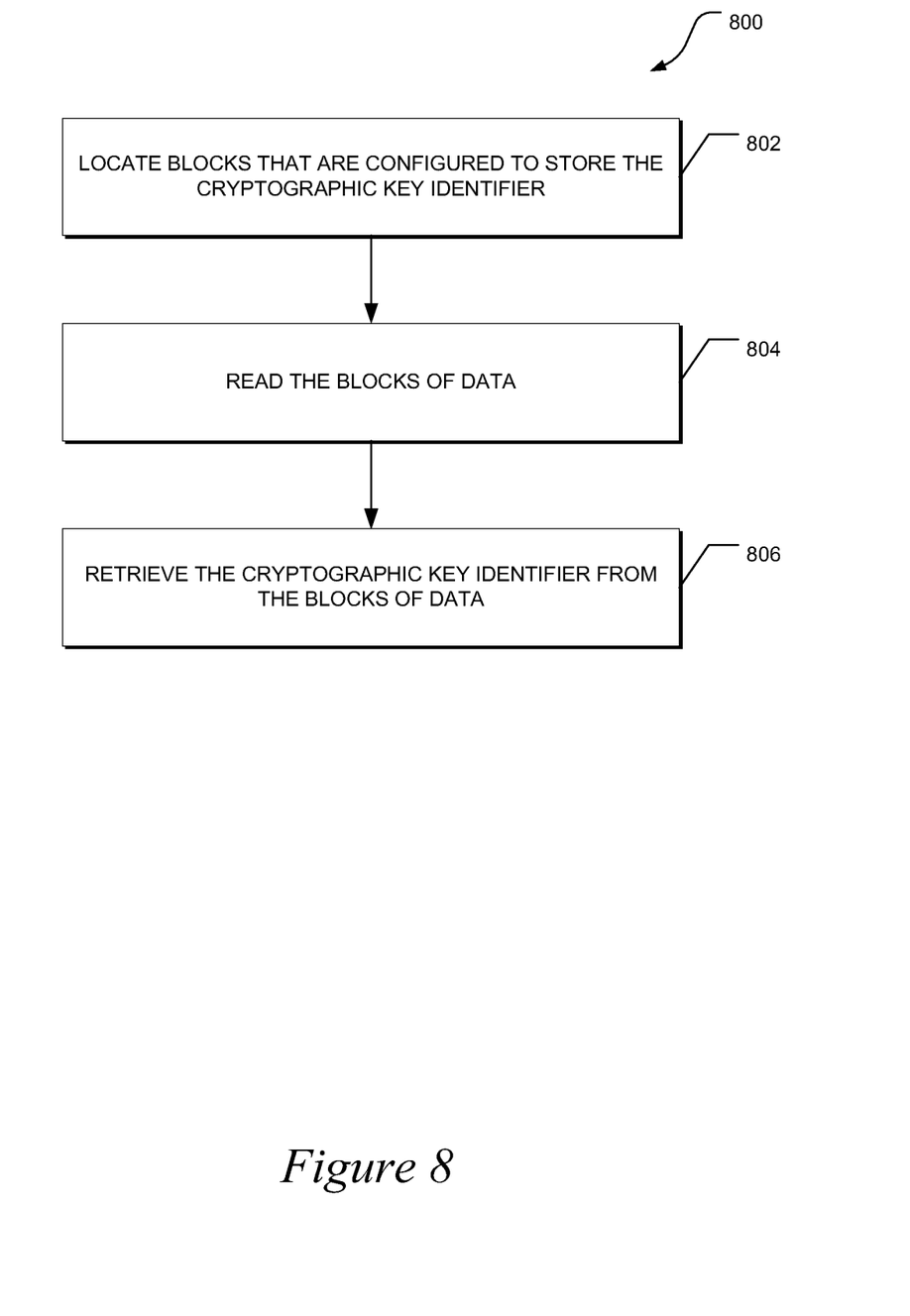
FIG. 8 depicts a flow diagram of a general overview of a method, in accordance with an example embodiment, for recovering a cryptographic key identifier from a logical disk.

FIG. 8 depicts a flow diagram of a general overview of a method, in accordance with an example embodiment, for recovering a cryptographic key identifier from a logical disk. In an example embodiment, method 800 may be implemented by storage network processing module 112 of FIG. 2 and employed in security appliance 104.

It should be appreciated that cryptographic keys used to decrypt data on logical disks may become lost, for example, from data corruption. As depicted in FIG. 8, to recover a cryptographic key identifier used to locate the cryptographic key, blocks that are configured to store the cryptographic key identifier are located on a logical disk at 802. As explained above, in an example embodiment, the blocks may include blocks that are configured to store file system information, such as blocks with LBA 1-16. Alternatively, in another example embodiment, every block to the power of two may be configured to store the cryptographic key identifier. For example, blocks located at LBA 2, 4, 8, 16, 32, . . . $2^n$ may be designated to store the cryptographic key identifier. To this end, block at LBA 2, block at LBA 4, block at LBA 8, block at LBA 16, block at LBA 32, . . . block at LBA $2^n$, where n is 1, 2, 3, 4, 5, . . . an increasing integer, are configured to store the cryptographic key identifier if the data within the blocks can be compressed to fit the cryptographic key. With such blocks located, the data located in the blocks, which may include metadata and compressed data, are read from the blocks at 804.

The cryptographic key identifier may then be retrieved from the blocks of data at 806. For example, to locate the cryptographic key identifier within the blocks of data, a marker is identified within the blocks of data. As discussed above, the marker may be a specific value that identifies the presence of metadata. The marker can be identified by locating the specific value of the marker within the blocks of data. If the marker cannot be identified or located within a block, then the cryptographic key identifier is not located in the block of data. In effect, the data cannot be compressed such that a cryptographic key identifier can fit within the block.

On the other hand, if the marker can be identified or located, a predefined offset from the marker is located, which is described above in FIG. 4. Returning to FIG. 8, the cryptographic key identifier is located at a predefined offset and may be read at the predefined offset. With the cryptographic key identifier recovered, the cryptographic key identifier may be used to locate an associated cryptographic key. For example, as discussed above, the cryptographic key identifier may be transmitted with a request for a cryptographic key to a key management module. In response, the key management module locates and retrieves the cryptographic key based on the cryptographic key identifier. This cryptographic key may then be used to decrypt data stored on the logical disk.

Figure 9:
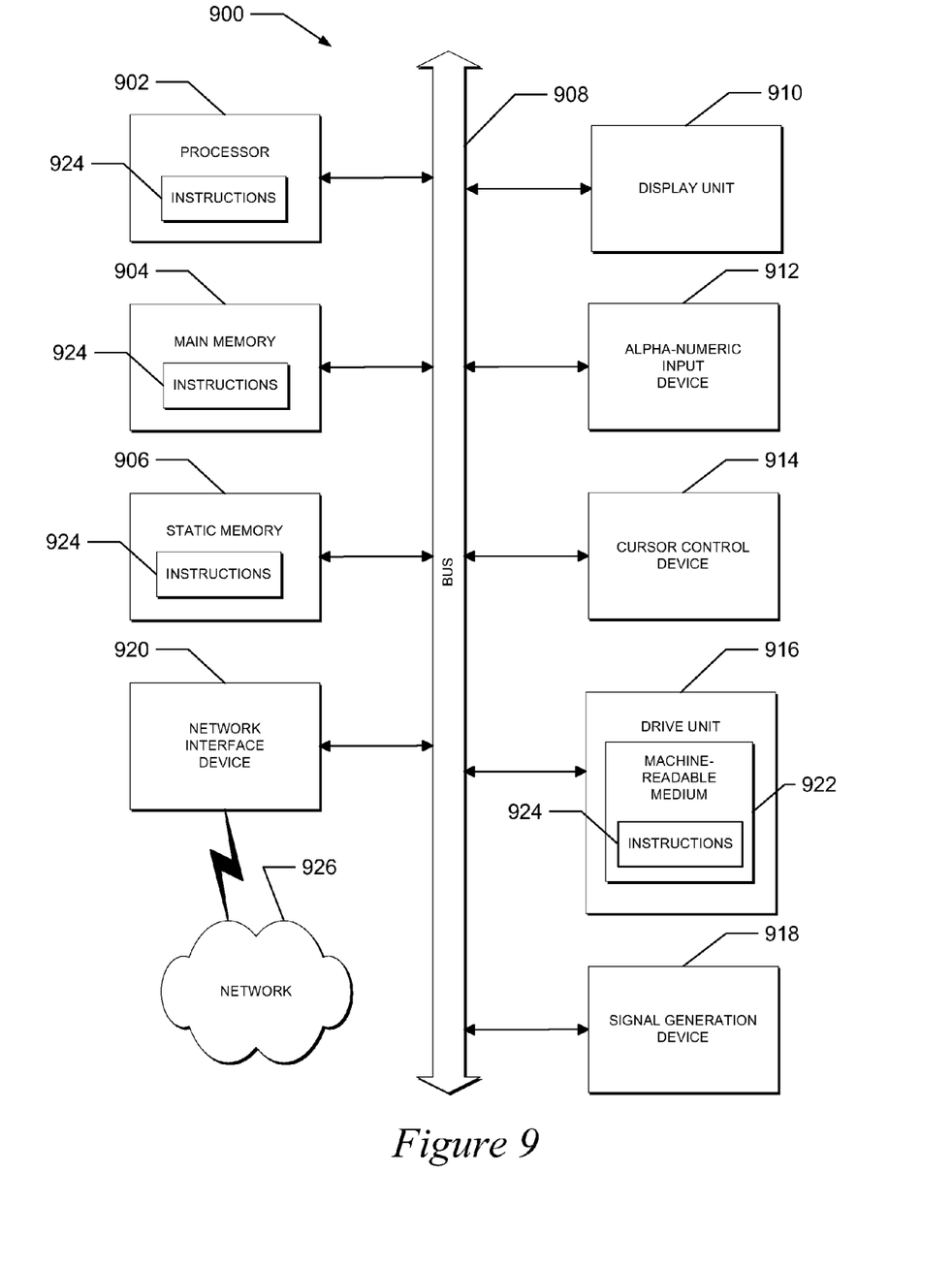
FIG. 9 depicts a simplified block diagram of a machine in the example form of a computing system within which a set of instructions, for causing the machine to perform any one or more of the methodologies discussed herein, may be executed.

FIG. 9 depicts a simplified block diagram of a machine in the example form of a computing system (or computing device) within which a set of instructions, for causing the machine to perform any one or more of the methodologies discussed herein, may be executed. In alternative embodiments, the machine may be connected (e.g., networked) to other machines. In a networked deployment, the machine may operate in the capacity of a server or a client machine in server-client network environment, or as a peer machine in a peer-to-peer (or distributed) network environment. The machine may be a server computer, a network switch, a set-top box (STB), a gateway, an appliance or any suitable machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computing system 900 includes processor 902 (e.g., a central processing unit (CPU), a graphics processing unit (GPU) or both), main memory 904 and static memory 906, which communicate with each other via bus 908. Computing system 900 may further include display unit 910 (e.g., a liquid crystal display (LCD)). Computing system 900 also includes alphanumeric input device 912 (e.g., a keyboard), user interface (UI) navigation device 914 (e.g., a mouse), disk drive unit 916, signal generation device 918 (e.g., a speaker) and network interface device 920.

Disk drive unit 916 includes machine-readable medium 922 on which is stored one or more sets of instructions and data structures (e.g., software 924) embodying or utilized by any one or more of the methodologies or functions described herein. Software 924 may also reside, completely or at least partially, within main memory 904 and/or within processor 902 during execution thereof by computing system 900, with main memory 904 and processor 902 also constituting machine-readable, tangible media. Software 924 may further be transmitted or received over network 926 via network interface device 920 utilizing any one of a number of well-known transfer protocols (e.g., Hypertext Transfer Protocol (HTTP)).

While machine-readable medium 922 is shown in an example embodiment to be a single medium, the term "machine-readable medium" should be taken to include a single medium or multiple media (e.g., a centralized or distributed database, and/or associated caches) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

While the invention(s) is (are) described with reference to various implementations and exploitations, it will be understood that these embodiments are illustrative and that the scope of the invention(s) is not limited to them. In general, techniques for storing and recovering cryptographic key identifiers may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A method of storing a cryptographic key identifier on a logical disk having a plurality of blocks, the method comprising:
   (a) determining a set of blocks of the plurality of blocks that is to store the cryptographic key identifier;
   (b) accessing a first block of the set of blocks;
   (c) compressing data stored in the first block;
   (d) encrypting the compressed data using a cryptographic key, the cryptographic key being identified by the cryptographic key identifier;
   (e) making a determination whether the compressed data and metadata that includes the cryptographic key identifier can be stored in the first block;
   (f) in response to determining that the compressed data and the metadata can be stored in the first block, storing the compressed data and the cryptographic key identifier in the first block; and
   (g) repeating steps (b) through (f) for another block from the set of blocks until all blocks from the set of blocks are accessed.

2. The method of claim 1, wherein making the determination whether the compressed data and the metadata can be stored in the first block includes determining a size of the first block and comparing the size of the first block with a total size of the compressed data and the metadata.

3. The method of claim 1, wherein the cryptographic key identifier is a value that is assigned to the cryptographic key.

4. The method of claim 1, wherein the metadata further includes a marker to identify a presence of the metadata in an individual block.

5. The method of claim 1, further comprising: receiving a request to write data to at least the set of blocks of the plurality of blocks from a client device.

6. The method of claim 1, wherein the cryptographic key is stored in another logical disk with one or more other cryptographic keys, wherein each of the one or more other cryptographic keys is also identified by a corresponding cryptographic key identifier.

7. The method of claim 1, wherein the set of blocks corresponds to a set of blocks that are accessed least frequently as compared to other blocks in the plurality of blocks.

8. A non-transitory computer-readable medium storing instructions that, when executed by a processor of a computing device, causes the computing device to perform operations comprising:
   (a) determining a set of blocks of a plurality of blocks of a logical disk that is to store a cryptographic key identifier;
   (b) accessing a first block of the set of blocks;
   (c) compressing data stored in the first block;
   (d) encrypting the compressed data using a cryptographic key, the cryptographic key being identified by the cryptographic key identifier;
   (e) making a determination whether the compressed data and metadata that includes the cryptographic key identifier can be stored in the first block;
   (f) if the compressed data and the metadata can be stored in the first block, storing the compressed data and the cryptographic key identifier in the first block;
   (g) if the compressed data and the metadata cannot be stored in the first block, uncompressing the data stored in the first block, encrypting the uncompressed data using the cryptographic key, and storing the uncompressed data in the first block; and
   (h) repeating steps (b) through (g) for another block from the set of blocks until all blocks from the set of blocks are accessed.

9. The non-transitory computer-readable medium of claim 8, wherein the instructions cause the computing device to make the determination whether the compressed data and the metadata can be stored in the first block by determining a size of the first block and comparing the size of the first block with a total size of the compressed data and the metadata.

10. The non-transitory computer-readable medium of claim 8, wherein the cryptographic key identifier is a value that is assigned to the cryptographic key.

11. The non-transitory computer-readable medium of claim 8, wherein the metadata further includes a marker to identify a presence of the metadata in an individual block.

12. The non-transitory computer-readable medium of claim 8, wherein the instructions cause the computing device to further perform operations comprising:
receiving a request to write data to at least the set of blocks of the plurality of blocks from a client device.

13. The non-transitory computer-readable medium of claim 8, wherein the cryptographic key is stored in another logical disk with one or more other cryptographic keys, wherein each of the one or more other cryptographic keys is also identified by a corresponding cryptographic key identifier.

14. The non-transitory computer-readable medium of claim 8, wherein the set of blocks corresponds to a set of blocks that are accessed least frequently as compared to other blocks in the plurality of blocks.

15. A computing device, comprising:
a network interface to communicate with a storage system, the storage system including at least a logical disk having a plurality of blocks;
a memory storing a set of instructions; and
a processor, coupled to the network interface and the memory, to execute the set of instructions, wherein the set of instructions, when executed by the processor, causes the computing device to perform operations comprising:
  (a) determining a set of blocks of the plurality of blocks that is to store a cryptographic key identifier;
  (b) accessing a first block of the set of blocks;
  (c) compressing data stored in the first block;
  (d) encrypting the compressed data using a cryptographic key, the cryptographic key being identified by the cryptographic key identifier;
  (e) making a determination whether the compressed data and metadata that includes the cryptographic key identifier can be stored in the first block;
  (f) if the compressed data and the metadata can be stored in the first block, storing the compressed data and the cryptographic key identifier in the first block;
  (g) if the compressed data and the metadata cannot be stored in the first block, uncompressing the data stored in the first block, encrypting the uncompressed data using the cryptographic key, and storing the uncompressed data in the first block; and
  (h) repeating steps (b) through (g) for another block from the set of blocks until all blocks from the set of blocks are accessed.

16. The computing device of claim 15, wherein the instructions cause the computing device to make the determination whether the compressed data and the metadata can be stored in the first block by determining a size of the first block and comparing the size of the first block with a total size of the compressed data and the metadata.

17. The computing device of claim 15, wherein the cryptographic key identifier is a random number that is assigned to the cryptographic key.

18. The computing device of claim 15, wherein the metadata further includes a marker to identify a presence of the metadata in an individual block.

19. The computing device of claim 15, wherein the instructions cause the computing device to further perform operations comprising:
receiving a request to write data to at least the set of blocks of the plurality of blocks from the client device via the network interface.

20. The non-transitory computer-readable medium of claim 8, wherein the cryptographic key is stored with one or more other cryptographic keys in another logical disk of the storage system, wherein each of the one or more other cryptographic keys is also identified by a corresponding cryptographic key identifier.

* * * * *